(12) United States Patent
Peterson

(10) Patent No.: US 6,266,525 B1
(45) Date of Patent: Jul. 24, 2001

(54) METHOD FOR DETECTING FRAUDULENT USE OF A COMMUNICATIONS SYSTEM

(75) Inventor: David Cartwright Peterson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/213,905

(22) Filed: Dec. 17, 1998

(51) Int. Cl.⁷ .................................................. H04M 1/66
(52) U.S. Cl. ............................................. 455/410; 455/411
(58) Field of Search ..................... 455/410, 411, 455/405; 380/23, 25, 21; 340/825.3, 825.34

(56) References Cited

U.S. PATENT DOCUMENTS

| | | | |
|---|---|---|---|
| 4,471,216 | * | 9/1984 | Herve ................................. 235/380 |
| 5,196,840 | * | 3/1993 | Leith et al. ....................... 340/825.3 |
| 5,241,598 | * | 8/1993 | Raith ...................................... 380/21 |
| 5,335,265 | * | 8/1994 | Cooper et al. ...................... 455/410 |
| 5,335,278 | * | 8/1994 | Matchett et al. ...................... 380/23 |
| 5,345,595 | * | 9/1994 | Johnson et al. .................... 455/410 |
| 5,467,382 | * | 11/1995 | Schorman ........................... 455/410 |
| 5,555,551 | * | 9/1996 | Rudokas et al. .................... 455/410 |
| 5,572,193 | * | 11/1996 | Flanders et al. ................. 340/825.34 |
| 5,613,214 | * | 3/1997 | Shirasawa et al. .................. 455/411 |
| 5,839,063 | * | 11/1998 | Lee ....................................... 455/410 |
| 5,918,173 | * | 6/1999 | Rosa ..................................... 455/411 |
| 5,953,652 | * | 9/1999 | Amin et al. ......................... 455/410 |
| 5,978,669 | * | 11/1999 | Sanmugam ......................... 455/410 |
| 5,991,617 | * | 11/1999 | Powell ................................. 455/410 |
| 6,091,945 | * | 7/2000 | Oka ..................................... 455/411 |
| 6,094,572 | * | 7/2000 | Sandre et al. ....................... 455/411 |

FOREIGN PATENT DOCUMENTS

119889 * 9/1984 (EP) .

\* cited by examiner

*Primary Examiner*—Vivian Chang
*Assistant Examiner*—Charles N. Appiah

(57) ABSTRACT

A method for detecting fraudulent use of a communications system detects and prevents fraud by assigning codes or randomly generated codes for communication access between a subscriber station and a fixed end and updating the codes upon the occurrence of one or more key events associated with subscriber activity in the communications system. The method permits detection and monitoring of fraudulent activity by permitting a legitimate subscriber station and an illegitimate subscriber station to have two different codes or dynamic codes after the legitimate subscriber station's identity has been misappropriated.

28 Claims, 12 Drawing Sheets

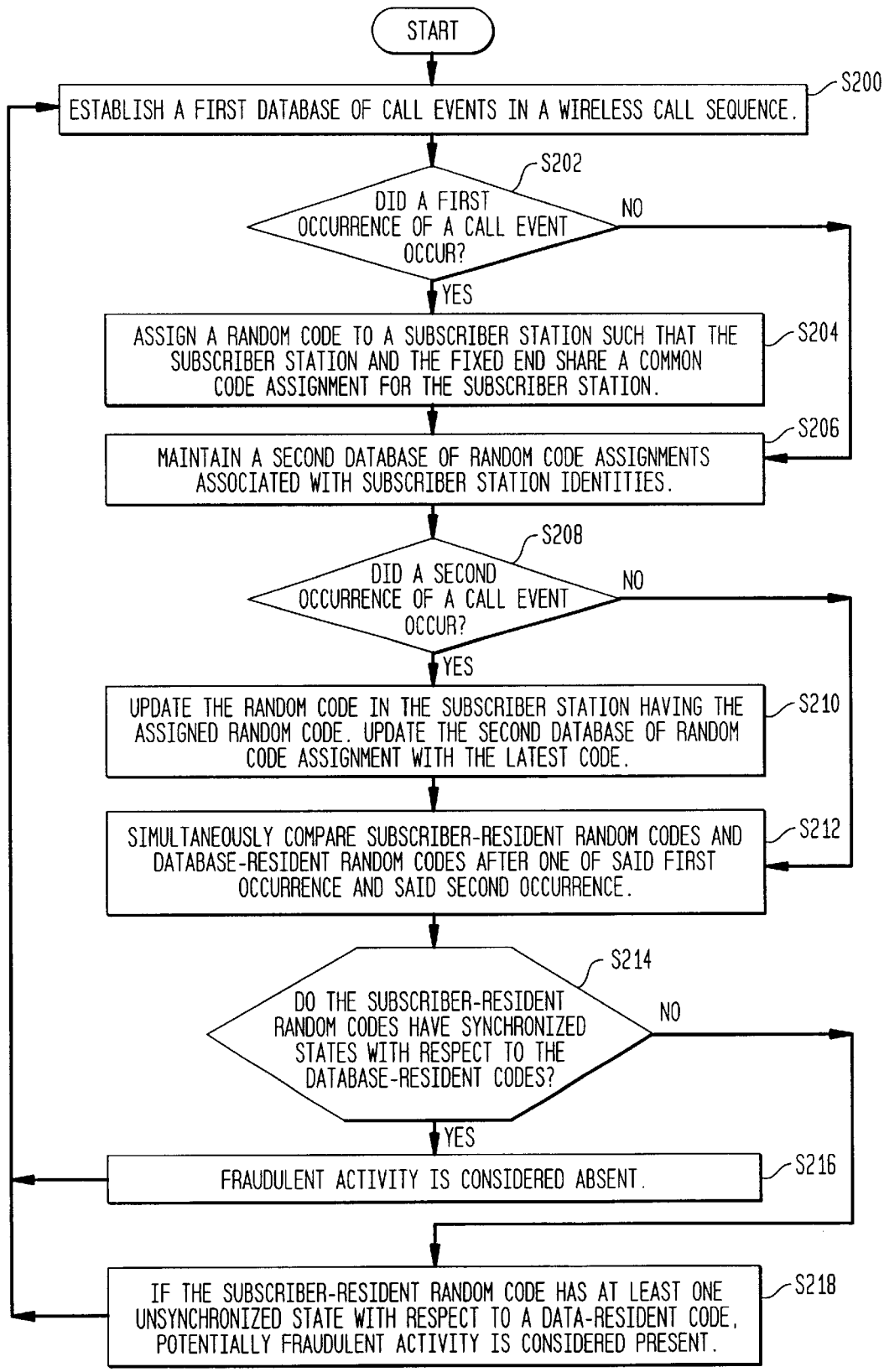

FIG. 13
DATABASE OF THE CALL EVENTS

| CALL EVENT | STATUS | SUBSCRIBER IDENTITY |
|---|---|---|
| 50 — CALL EVENT | 64 STATUS | 70 SUBSCRIBER IDENTITY |
| 52 — REQUEST FOR ACCESS | ACTIVE — 66 | 10987566 |
| 54 — TERMINATION OF A MOBILE-ORIGINATED CALL | ACTIVE | 10987566 |
| 56 — TERMINATION OF A LAND-LINE ORIGINATED CALL | INACTIVE | 10987566 |
| 58 — GRANT OF A DATA CHANNEL | INACTIVE — 68 | 10544932 |
| 60 — GRANT OF A VOICE CHANNEL | ACTIVE | 10544932 |
| 62 — CALL INTERVAL UPDATE | 10 MIN | 10544932 |
| 62 — CALL INTERVAL UPDATE | 0 MIN | 11043695 |

FIG. 14
CALL TAG SEQUENCES

| CALL DESCRIPTION | SEQUENCE | SUSCRIBER CALL TAG — 75 | | SUBSCRIBER DATABASE CALL TAG — 77 |
|---|---|---|---|---|
| 79 — NORMAL CALL 1 | BEFORE SETUP | 7 | | 7 |
| | AFTER SETUP | 13 | | 13 |

| CALL DESCRIPTION | SEQUENCE | SUSCRIBER CALL TAG — 75 | | SUBSCRIBER DATABASE CALL TAG — 77 |
|---|---|---|---|---|
| 81 — NORMAL CALL 2 | BEFORE SETUP | 13 | | 13 |
| | AFTER SETUP | 17 | | 17 |

FIG. 15
CALL TAG SEQUENCES W/CLONED PHONE

| CALL DESCRIPTION | SEQUENCE | SUSCRIBER CALL TAG 108 | CLONED PHONE CALL TAG 106 | SUBSCRIBER DATABASE CALL TAG 110 |
|---|---|---|---|---|
| 100 — EAVESDROPPED | BEFORE SETUP | 17 | | 17 |
| | AFTER SETUP | 23 | 23 | 23 |
| 102 — CLONE CALL | BEFORE SETUP | 23 | 23 | 23 |
| | AFTER SETUP | 23 | 31 | 31 |
| 104 — SUBSCRIBER | BEFORE SETUP | 23 | | 31 |
| | AFTER SETUP | 35 | | 35 |

METHOD FOR DETECTING FRAUDULENT USE OF A COMMUNICATIONS SYSTEM

FIELD OF THE INVENTION

The present invention relates to a method for detecting fraudulent use of a communications system, such as a digital wireless communication system, an analog wireless communication system, a digital cellular system, an analog cellular system, a personal communications service, or the like.

BACKGROUND OF THE INVENTION

Authentication is a procedure used by a communications system to validate a subscriber station's identity upon a request for access to the communications system. The communications system may grant or deny the subscriber station's request for access according to the authentication procedure. Over time, authentication schemes have become more sophisticated to foil fraud as older analog cellular equipment is supplemented or replaced with newer digital equipment.

In many analog cellular systems in wide-spread use throughout the U.S., each authorized cellular phone is assigned a unique Mobile Identification Number (MIN) to prevent fraudulent use of the cellular phone if it is stolen. However, the unique MIN of an authorized cellular phone may be readily programmed into any compatible unauthorized cellular phone. For example, when an authorized user makes a call from an authorized cellular phone, a fraudulent perpetrator may eavesdrop on a cellular call setup sequence of the authorized cellular phone to obtain the MIN. The fraudulent perpetrator then programs the unauthorized cellular phone to have the same MIN that the authorized cellular phone has. Because the unauthorized cellular phone now has the same identity as the authorized cellular phone, the fraudulent perpetrator can make calls from the unauthorized cellular phone that are billed to the user of the authorized cellular phone.

The GSM (Group Special Mobile) cellular system features a more complex approach to authentication and fraud prevention than many analog cellular systems do. GSM determines a traffic channel encoding key at the fixed end for comparison to a traffic channel encoding key determined at the mobile station. At the fixed end, the GSM cellular system has an authentication center including a random number generator, a database for subscriber ciphering keys, and a ciphering/deciphering algorithm. The random number generator generates a random number in response to a mobile station's request for access. The ciphering/deciphering algorithm derives a traffic channel encoding key from the random number and a subscriber ciphering key from the database. The authentication center sends the random number to the base station through communication lines. The base station transmits the random number to the mobile station via radio frequency (RF) communication.

At the mobile end, the mobile station receives the random number and generates the same traffic channel encoding key as the fixed end does. The mobile station generates the same traffic channel encoding key from the random number and its locally-stored subscriber ciphering key. The traffic channel encoding key is generated for use only during a single call between the base station and the mobile station and is regenerated for each new communication.

In addition, to the above authentication procedure, GSM further includes a signed response algorithm for generating a signed response from the subscriber ciphering key and the random generator. If the signed response calculated at the authentication center matches the signed response calculated at the mobile unit, the communication access of the mobile is valid. The comparison of the signed response of the mobile unit and the authentication center is made in the fixed end equipment after the mobile transmits the signed response to the base station.

However, GSM cellular systems may be subject to the same fraudulent use as less sophisticated communication systems because of the subscriber identity configuration. GSM uses an elaborate subscriber identity configuration which includes an international mobile subscriber identity (IMSI) and an international mobile station equipment identity (IMEI). The IMSI is stored on a smart card which is intended to interface with any GSM cellular phone. The GSM cellular phone itself includes an international mobile station equipment identity (IMEI).

The IMSI is normally communicated to the communication system during an access request by the mobile station prior to encryption as described above. The mobile switching center (MSC) may request the transmission of the IMSI from the mobile station for land-line originated calls. Accordingly, an unauthorized eavesdropper may gain information to misappropriate the identity of the valid subscriber's smart card during the unencrypted transmission. In sum, both MIN's and IMSI's are vulnerable to fraudulent activity.

Therefore, a need exists for detecting fraudulent use of a communications system. In particular, a need exists for detecting fraudulent use of conventional analog cellular systems, GSM cellular systems, TDMA cellular systems, and CDMA cellular systems, among others.

SUMMARY OF THE PRESENT INVENTION

In accordance with the present invention, a method for detecting fraud in a wireless communications system includes establishing one or more call events in a wireless call sequence. In response to occurrences of the call events, codes are assigned corresponding to the subscriber stations such that each subscriber station has a distinguishable code from all other subscriber stations. The codes are distinguishable even if at least two of the subscriber stations share a common subscriber identity. A database of subscriber identities is maintained and supplemented by the codes such that a unique combination of the code and the subscriber identity uniquely identifies each subscriber station. Identical or common subscriber identities are identified with corresponding different codes in the database. Any common subscriber identities with different codes indicate potentially fraudulent activity on the communications system.

The method of the invention permits detection and monitoring of fraudulent activity by permitting a legitimate subscriber station and an illegitimate subscriber station to have two different codes after the legitimate subscriber station's identity has been misappropriated. In a preferred embodiment, the codes are random codes which are dynamically updated to discourage fraudulent activity on the communications system.

In one aspect of the invention, the legitimate subscriber station may be identified if the legitimate subscriber makes a key phone call or a call conforming to an historical call pattern. Once the legitimate subscriber station is identified, the illegitimate subscriber station may be monitored by tracking a unique combination of a random code and a subscriber identity, which represents the illegitimate subscriber identity.

In another aspect of the invention after the legitimate subscriber station is identified, the illegitimate subscriber station is deactivated and the subscriber-resident random code of the legitimate subscriber station is synchronized with a database-resident random code in the fixed end.

BRIEF DESCRIPTION OF THE DRAWINGS

FIG. 12 is a flow chart illustrating an alternate method for detecting and preventing fraud, in accordance with the invention.

FIG. 13 is an illustrative database of call events.

FIG. 14 is a chart showing an illustrative code assignment sequence for an authorized subscriber station based on any key event.

FIG. 15 is a chart showing a code assignment during which identification of an authorized subscriber station is misappropriated.

DETAILED DESCRIPTION OF THE PREFERRED EMBODIMENT

Figure 1:
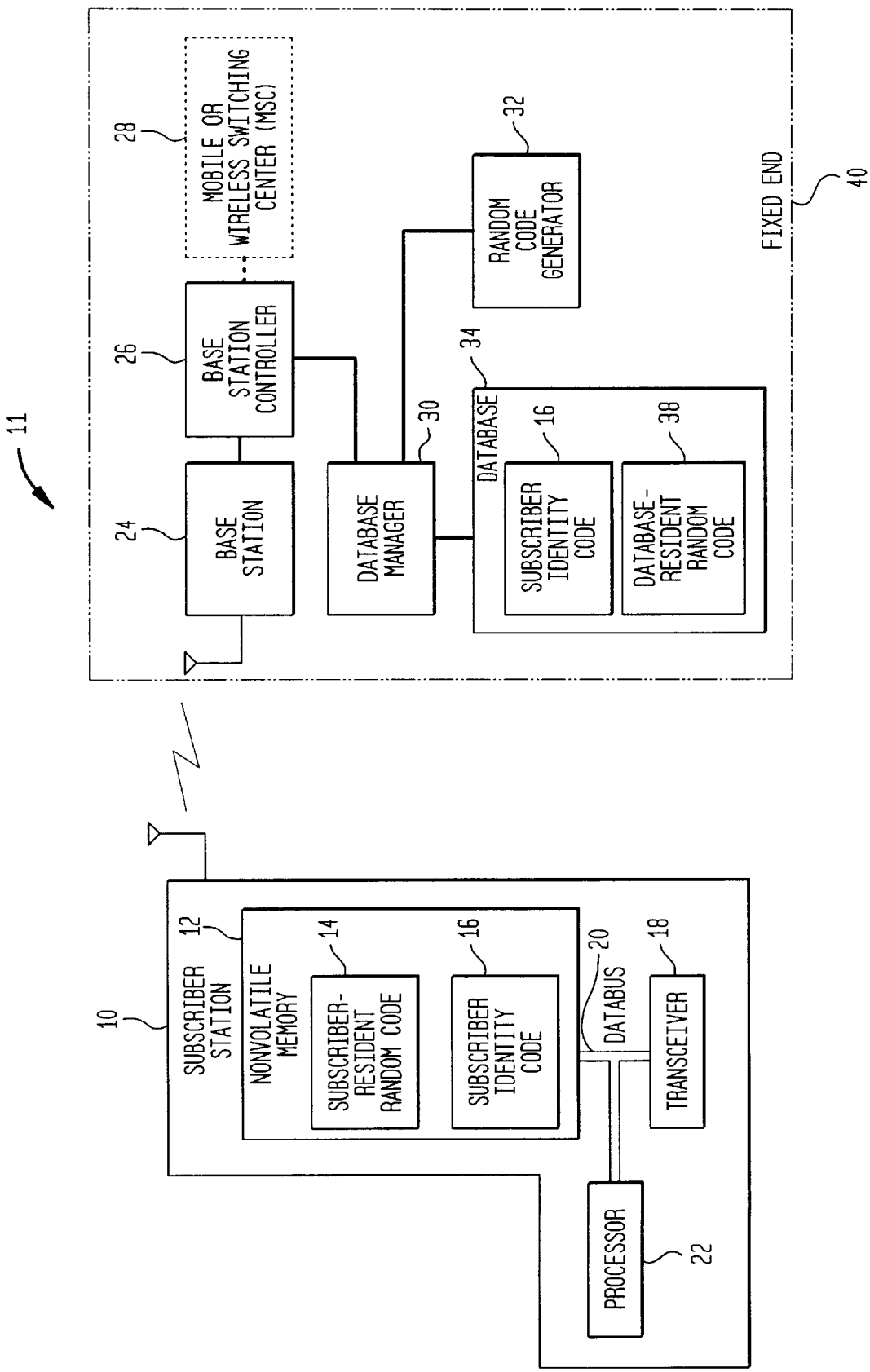
FIG. 1 is a block diagram of a first illustrative embodiment of a communications system which is suitable for practicing the method of preventing and detecting fraud in accordance with the invention.

In accordance with the present invention, FIG. 1 illustrates a first embodiment of a communication system 11 for practicing the method of detecting or preventing fraud. The communication system 11 comprises subscriber stations 10 and a fixed end 40. The fixed end 40 preferably includes a base station 24, a base station controller 26, a subscriber database 34, a database manager 30, and a random code generator 32.

The subscriber stations 10 preferably comprise transceivers 18 for radio frequency communication with the base station 24. In a preferred embodiment, the subscriber station 10 is similar to a conventional commercially available cellular phone, except the subscriber station 10 has a code management system. The code management system preferably includes sufficient nonvolatile memory 12 for storing a subscriber-resident random code 14, a subscriber identity code 16, and software instructions for managing the transmission and reception of the subscriber-resident random code 14.

In general, the subscriber station 10 includes nonvolatile memory 12, software instructions for managing the transmission and receipt of random codes, a processor 22 for executing the software instructions, a databus 20 for communication of software instructions and movement of the random codes.

The randomly generated code is transmitted from the fixed end 40 equipment via electromagnetic energy to a transceiver 18 or receiver of the subscriber station 10. A demodulator within the transceiver 18 or receiver is preferably coupled to the nonvolatile memory 12 via the databus 20. In practice, a Universal Asynchronous Receiver-Transmitter (UART) or another suitable interface may interface the transceiver 18 to the databus 20. The processor 22 may store a random code from the demodulator in random access memory or the like prior to transfer through the databus 20 to the nonvolatile memory 12.

The nonvolatile memory 12 may comprise volatile memory refreshed periodically or powered continuously to emulate nonvolatile memory 12. In alternate embodiments, the nonvolatile memory 12 may comprise electronically erasable programmable read only memory (EEPROM), a magnetic storage medium, a register in a processor 22, an optical storage medium, or the like.

The software instructions determine that the random code is transmitted from the subscriber station 10 in accordance with an agreed upon convention between the subscriber station 10 and the fixed end 40. Generally, the subscriber-resident random code 14 transmitted from the subscriber 10 to the base station 24 may serve as an acknowledgement that the new code assignment was received by the subscriber station 10 from the fixed end equipment 40.

The base station 24 preferably comprises a transceiver 18 for communication with one or more subscriber stations 10 via radio frequency traffic channels. In practice, multiple base stations may be co-located at a single site or multiple sites to meet the capacity requirements of subscriber stations 10 based on the predicted subscriber use of the communication system 11.

The base station controller 26 controls channel assignment activity and access to the communication system 11. The controller 26 may form an integral part of the base station 24, rather than a separate device. The base station controller 26 interfaces the base station 24 to an optional mobile switching center 28 (MSC). Either the MSC 28 or the base station controller 26 controls the base station's transmission of a randomly generated code to the subscriber stations 10.

The mobile switching center 28 (MSC) preferably comprises a telecommunications switch for routing, interconnecting, and circuit switching of telecommunication channels. The MSC 28 preferably services channel traffic between a telecommunications network (i.e. Public Switched Telephone Network)and the communication system 11. The MSC 28 includes any switch suitable for wireless local loop (WLL) and other wireless applications regardless of whether the subscriber stations are mobile or stationary.

The fixed end 40 includes a database manager 30 for managing a subscriber database 34 and a random code generator 32. The database manager 30 may comprise an appropriately programmed general purpose computer. The subscriber database 34 contains subscriber identity codes 16 for the subscriber stations 10 and database-resident random code 38. Each subscriber station 10 has a unique combination of a subscriber identity code 16 and a database-resident random code 38 so that all subscriber stations 10 may be distinguished from one another. Accordingly, the unique combinations of subscriber identification in the subscriber database 34 permit illegitimate subscriber stations to be distinguished from legitimate subscriber stations. As used herein, illegitimate shall mean unauthorized to use a subscriber station 10 to access the communications system 11 and legitimate shall mean authorized to use the subscriber station 10 to access the communications system 11. In a preferred embodiment, the random code generator 32 comprises a random number generator.

In practice, the communication system may comprise an analog wireless system, a digital wireless system, an analog cellular system, a digital cellular system, a GSM system, a (Code Division Multiple Access) CDMA system, Advanced Mobile Phone System (AMPS) system, wireless local loop (WLL) system, or the like.

Figure 2:
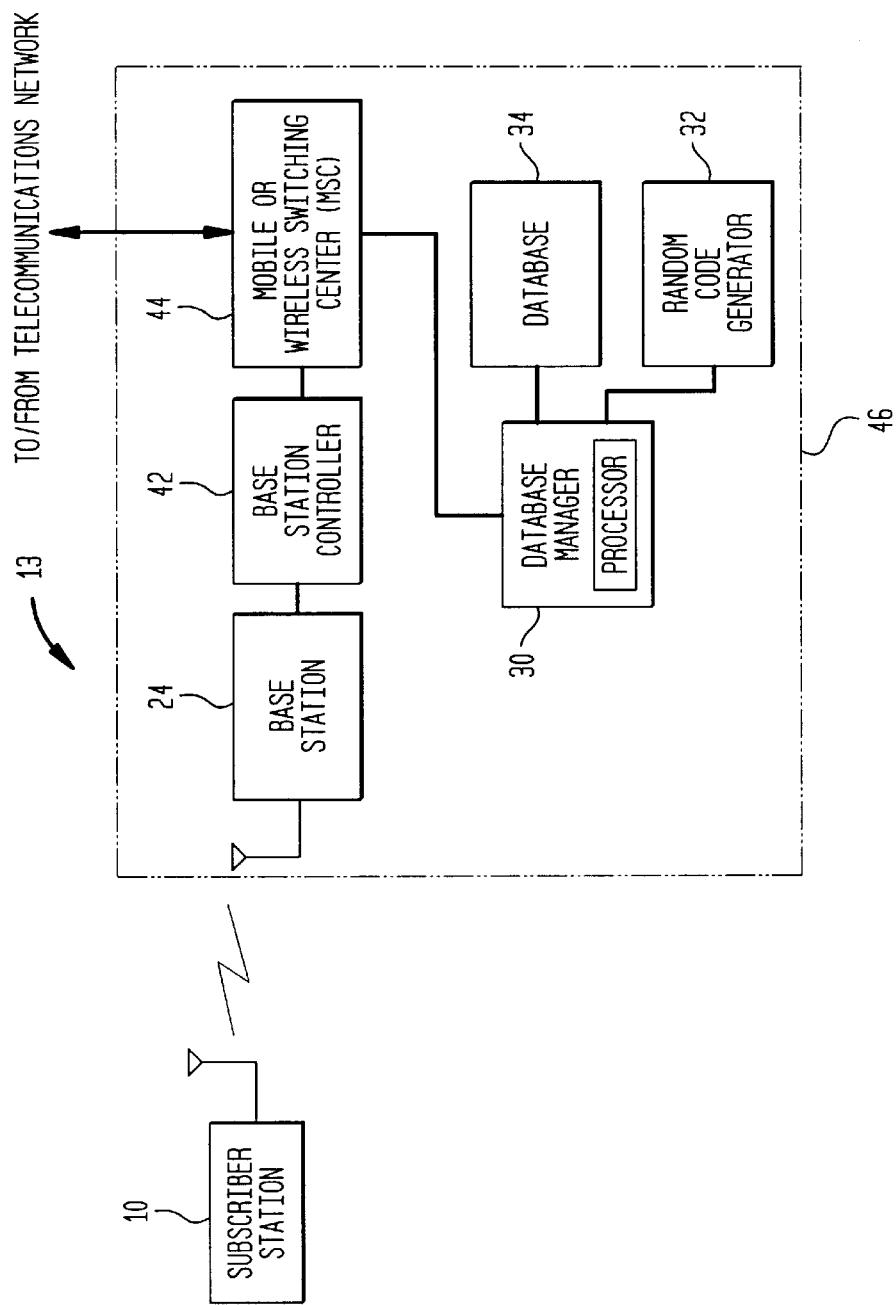
FIG. 2 is a block diagram of a second illustrative embodiment of a communications system which is suitable for practicing the method of preventing and detecting fraud in accordance with the invention.

FIG. 2 illustrates a second embodiment of a communication system 13 for practicing the method of detecting and preventing fraud of the invention. FIG. 2 clarifies that the database manager 30, the subscriber database 34, and the random code generator 32 may interface with an MSC 44, instead of interfacing with the base station controller 26 as shown in FIG. 1. Accordingly, a base station controller 42 of FIG. 2 does not require a port or an interface for the database manager 30. Generally, one subscriber database is preferred for each MSC 44. Multiple subscriber databases may be networked or in communication to permit sharing of information in different subscriber databases.

Authentication is a procedure used by a communications system to validate a subscriber's identity upon a request for access to the communications system. Certain digital cellular systems support a Home Location Register (HLR). A Home Location Register is a database that contains subscriber information such as subscriber access capability, active service features, inactive service features, and the Visitor Location Register (VLR) of active subscribers.

The present method is well-suited for incorporation in VLR and HLR. The method for preventing and detecting fraud may be implemented by software appropriate software instructions for manipulating the contents of databases such as the VLR, the HLR, or the both the VLR and HLR. A VLR or an HLR may even be used instead of the database manager 30 and the database 34.

Figure 3:
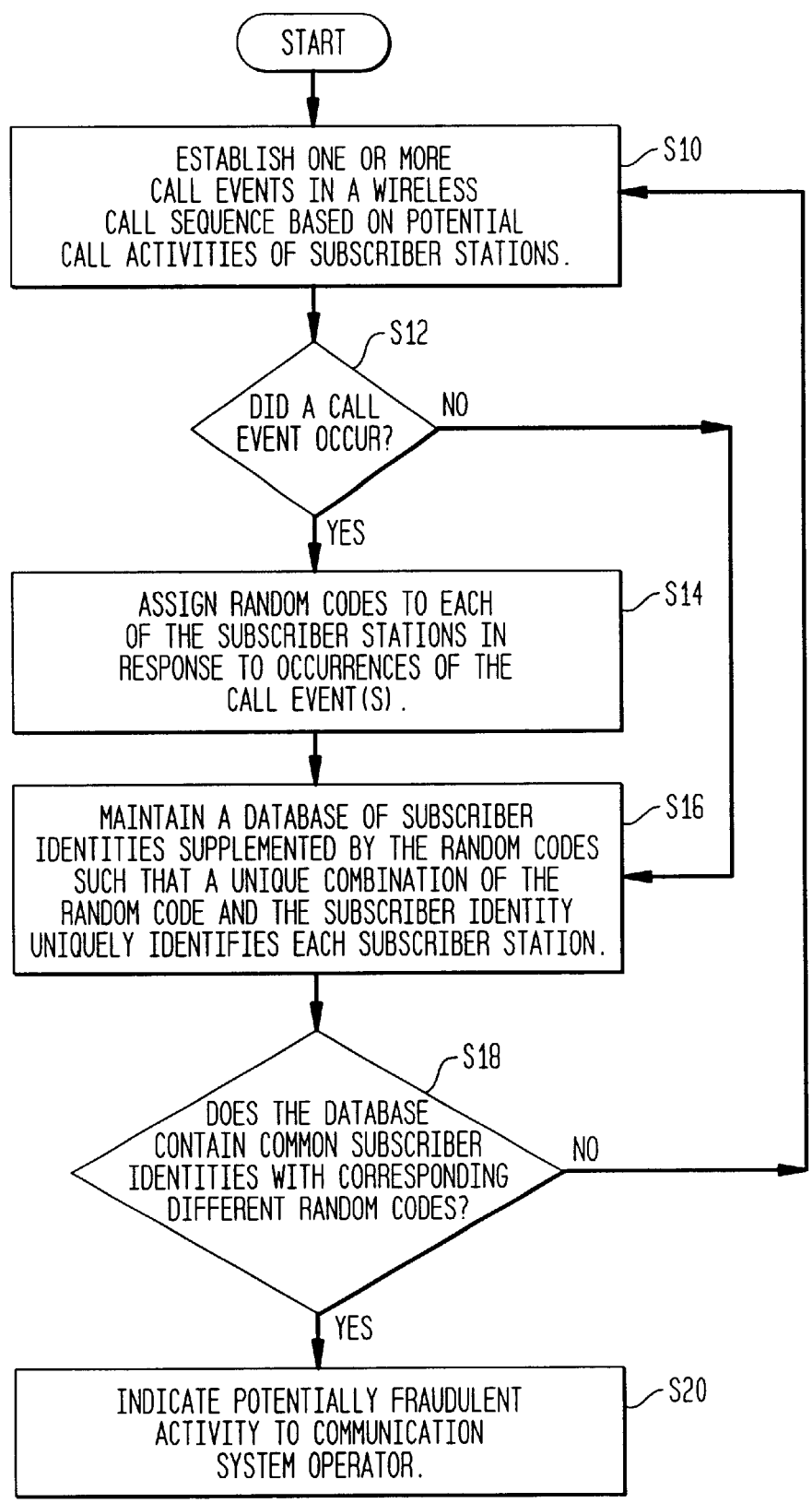
FIG. 3 is a flow chart of a method for detecting fraud in a wireless communication system in accordance with the invention.

FIG. 3 shows a preferred example of a method for detecting fraud in wireless communications system, according to the invention. The method of FIG. 3 includes establishing call events, assigning random codes to subscriber stations in response to the call events, maintaining a database of subscriber identities supplemented by the random codes, and identifying common subscriber identities with different random codes as being indicative of potentially fraudulent activity on the communication system. In step S10, one or more call events is established in a wireless call sequence based on potential call activities of subscriber stations. A call sequence refers to a period starting from call initiation to call termination of a call or another communication, regardless of whether the call is a land-line initiated call or a subscriber initiated call. During the call sequence the communication system may support communications of the subscriber by allowing set-up procedures, hand-off procedures, authentication procedures, acknowledgement procedures, tear-down procedures, or other communication-related procedures. The call activities of a subscriber are actions attributable to the subscriber that result in execution of communication system operations or communication-related procedures during the ordinary course of a call sequence.

In step S12, the communications system decides whether or not a call event has occurred. If a call event occurred, the method continues at step S14. However, if the call event did not occur, the method continues at step S16 and skips step S14.

In step S14, random codes are assigned to each of the subscriber stations, in response to corresponding occurrences of the call events established in step S10. The random codes are assigned such that each subscriber station has a distinguishable code from all other subscriber stations even if at least two of the subscriber stations share a common subscriber identity. As used herein, random code refers to a completely random code, a quasi-random code, a pseudo-random code, a dynamic code, or the like. The pseudo-random code is derived from a code sequence having a sufficiently long period of repetition so as to discourage fraudulent decoding of the code sequence. Although a random code is preferred for maximizing fraud prevention, in an alternate embodiment a code generator generates a code, an assignable code, or an updatable code instead of the random code.

In step S16, a database of subscriber identities is maintained in which the subscriber identities are supplemented by the random codes. The supplementation of the random codes occurs such that a unique combination of the random code and the subscriber identity uniquely identifies each subscriber station. The random codes may be dynamically updated after one or more further call events occur.

In step S18, the communications system or the database manager determines if the database contains common subscriber identities with corresponding different random codes. If the database contains common subscriber identities with corresponding different random codes, the method continues at step S20. However, if the database does not contain common subscriber identities with different random codes, the method loops back to S10.

In step S20 potentially fraudulent activity is indicated to notify a communication system operator. In a preferred method, the operator is notified at a display of an Operations Maintenance Center (OMC) for a communications system or a similar operator interface to the communications system.

In the absence of fraudulent activity on the communication system, no common subscriber identities should ordinarily exist. On the other hand, the presence of two or more subscriber stations with common subscriber identities indicates potentially fraudulent activity. Sleuthing the existence of the common subscriber identities depends upon an evaluation of the random codes in the database.

The database is allowed to have multiple entries for a single subscriber station identity. The multiple entries are called common subscriber station identities. The common subscriber station identities can be distinguished from one another by different random codes augmenting, appending, supplementing, or otherwise associated with the common subscriber station identities.

Common subscriber identities include at least a first subscriber identity and a second subscriber identity, where the first subscriber identity has an equivalent code value to the second subscriber identity. The first subscriber identity is only distinguishable from the second subscriber identity with reference to the random codes, at least until any flags are set. The subscriber identities are supplemented by the random codes such that a unique combination of the random code and the subscriber identity uniquely identifies each subscriber station.

The random codes have a sufficient number of code states to minimize the probability that two identical random codes are assigned to common subscriber station identities. The minimum number of code states required will be proportional to the number of subscribers on the communications system. The random codes may be permutations or combinations of code elements. Code elements may be binary numbers, hexadecimal numbers, base ten numbers, numbers, character strings, or the like.

The presence of two common subscriber identities with different random codes may not always be the result of the fraudulent activity. Common subscriber identities may be used by technicians and engineers testing communication systems. In other cases, radio frequency coverage problems, radio frequency interference, or electromagnetic noise may cause a failure of the subscriber station 10 to receive an assigned random code or an updated random code from the base station 24. To improve system reliability, the random codes may by enhanced by error correction algorithms, acknowledgements of receipt of transmission between the subscriber station 10 and the base station 24, or other techniques that are well-known in the art. Therefore, assuming the system reliability is sufficient, if any common subscriber identities with different random codes are found, the finding is probative or indicative of potentially fraudulent activity on the communications system.

Accordingly, the method of FIG. 3 may further include denying access of an illegitimate or a legitimate subscriber station to a communications channel if the codes at the fixed end 40 and the corresponding subscriber-resident code 14 at and the subscriber station 10 do not match. Conversely, access to an illegitimate or a legitimate subscriber station is granted by assigning a communication channel to a subscriber station 10 if the codes at the fixed end 40 and the subscriber station 10 match.

On the other hand, the method of FIG. 3 may further include monitoring access to the communications system by assigning a communications channel regardless of whether the subscriber-resident random codes 14 match the databaseresident random codes 38 or not to prevent wrongfully denying access to the legitimate subscriber station and/or to allow tracking the communication activity of the illegitimate subscriber station on the communications system. Such tracking may provide a sufficient paper trail for pursuing criminal or civil liability against the illegitimate subscriber.

In a variation of the method of FIG. 3, step S20 is eliminated. Further, after finding common subscriber identities with associated random codes that do not match one another in step S18, each of the common subscriber identities may be separated into an illegitimate subscriber identity (with a first associated random code) and an legitimate subscriber identity (with a second associated random code distinct from the first random code) by tracking call activities of the common subscriber identities found.

After identification of the first associated random code and the second associated random code, both the unauthorized and authorized activity is tracked so that the legitimate subscriber is not billed for the illegitimate subscriber's use of the illegitimate subscriber station. By using the different random codes separate bills may be accurately generated for the legitimate subscriber and the illegitimate subscriber. The illegitimate subscriber may be located, for example, by location determining equipment in a cellular system during communication system activity by the illegitimate subscriber. The location-determining equipment may comprise a global positioning receiver (GPS) or another receiver for comparing the timing of reference signals from known locations to determine the location of the illegitimate subscriber.

Figure 4:
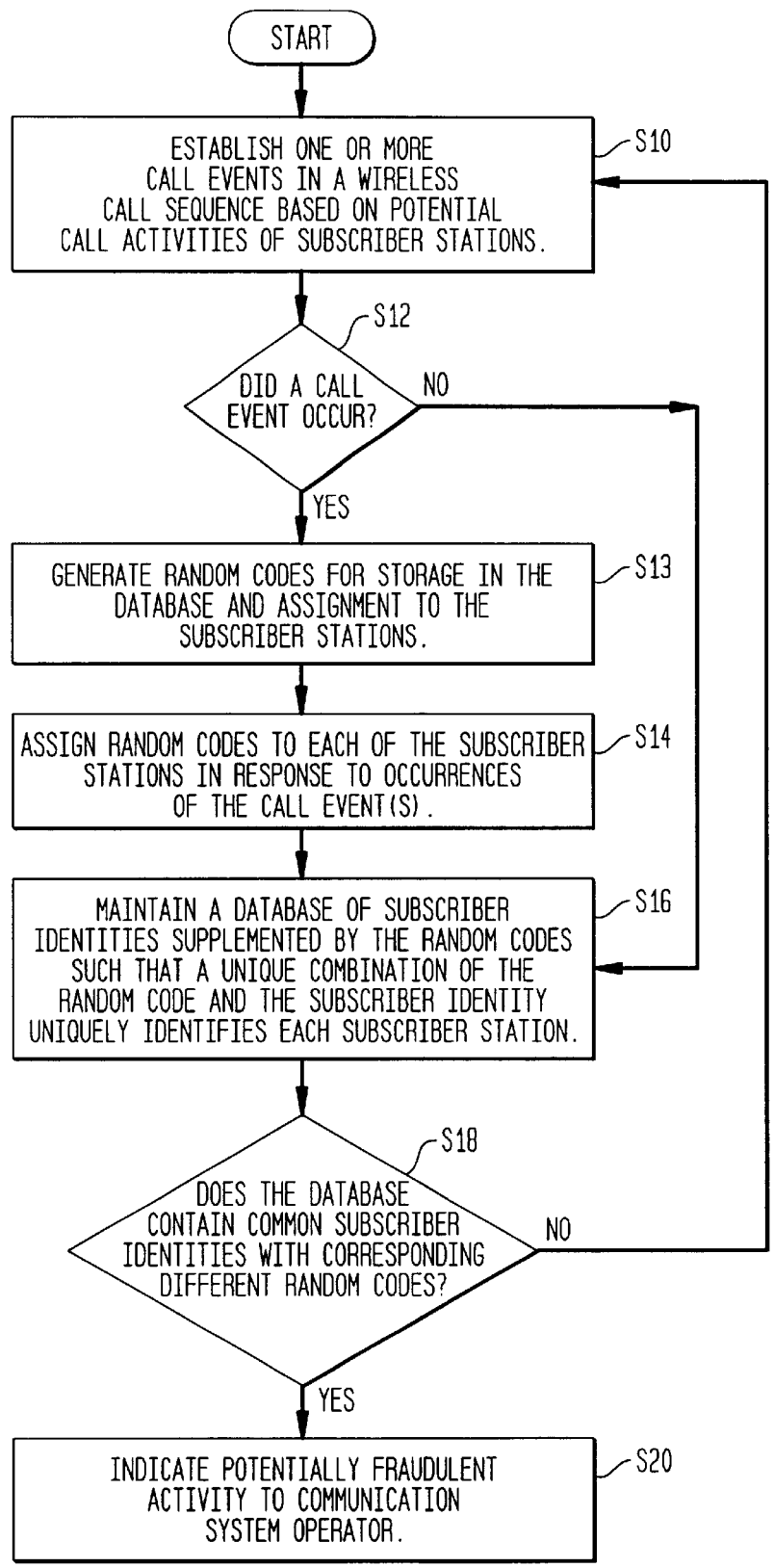
FIG. 4 is a flow chart adding an additional step to the method of FIG. 3.

FIG. 4 supplements the method of FIG. 3 with an additional step S13. Step S13 follows step S12 if it is determined that a call event occurred. Step S13 includes generating random codes for storage in the database and assignment to the subscriber stations. The assigning of random codes in step S14 follows step S13. The random codes prevent or discourage misappropriation of the legitimate subscriber's identity by changing the legitimate subscriber's unique combination upon or after the occurrence of a predefined event or events. Accordingly, the illegitimate subscriber requires the random code to misappropriate the legitimate subscriber's identity. Misappropriation generally requires the illegitimate subscriber's eavesdropping for an extended period of time followed by the illegitimate subscriber's accessing the communications system prior to the legitimate subscriber's making another call.

While the generation of random codes in S13 could trigger the assignment of the generated random codes in S14, unassigned random codes may be stored in a database or memory for future use, rather than generating random codes in real-time or on the fly. The future requirement for the assignment of the unassigned random codes may be triggered by the occurrence of a call event as determined in step S12.

Figure 5:
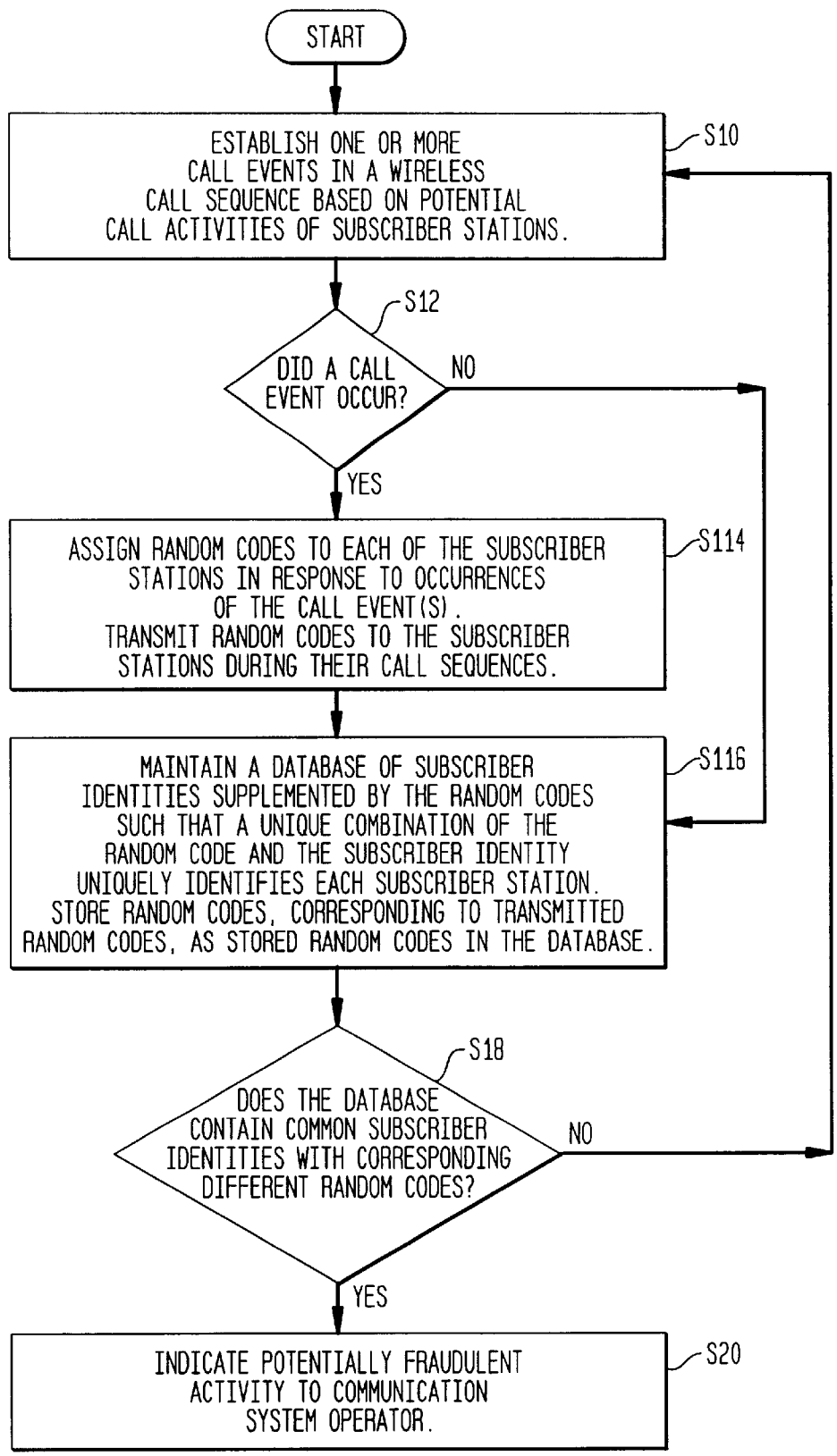
FIG. 5 is a flow chart further defining the assigning step and the maintenance step of FIG. 3.

FIG. 5 supplements the method of FIG. 3 by further defining the assignment of random codes and the maintenance of a database. FIG. 5 replaces step S14 and step S16 of FIG. 3 with steps S114 and S116, respectively. The assigning step S114 comprises transmitting random codes to the subscriber stations during their call sequences or during call setup. The transmitted random codes correspond to stored random codes for storage in the database. Thereafter, in step S116 random codes, corresponding to transmitted random codes, are stored as stored random codes in the database. The stored random codes are associated with each call. One random code or multiple random codes are allowed for each call, depending upon the number of events triggering updates of the random codes for the legitimate subscriber. The calls may be identified by phone number or another telecommunications address. The stored random codes may be archived for future reference to identify potentially fraudulent use of the communications system.

Figure 6:
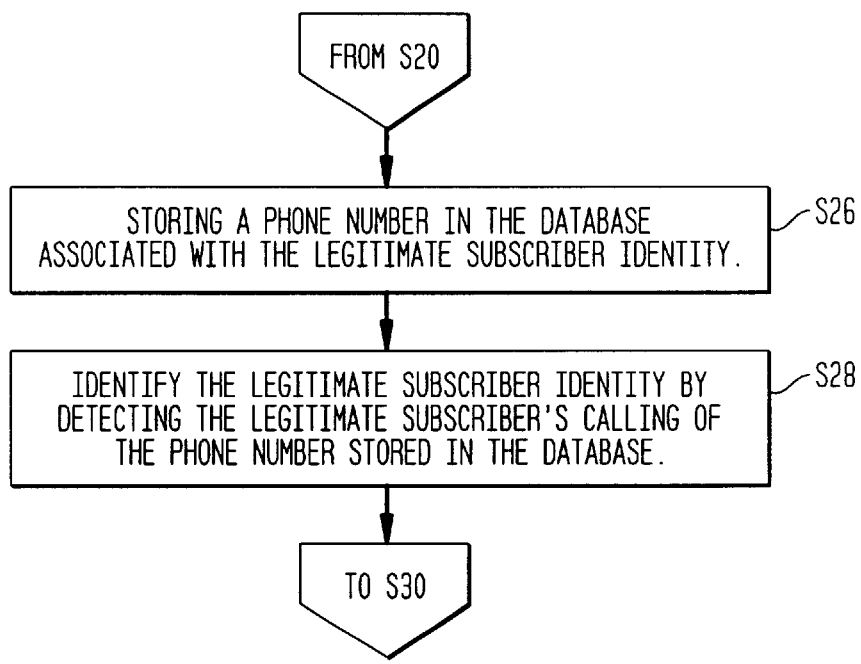
FIG. 6 is a flow chart showing a first illustrative identification procedure which may supplement FIG. 3, FIG. 4, or FIG. 5.

FIG. 6 illustrates additional steps which may follow indication of potentially fraudulent activity in step S20 in FIG. 3 through FIG. 5. The steps of FIG. 6 are illustrative examples of distinguishing a legitimate subscriber from an illegitimate subscriber. Identification of the legitimate subscriber allows appropriate adjustment of billing and allows maintenance of a desired grade of service (GOS) for the legitimate subscriber. FIG. 6 represents an identification procedure which is a precursor to attaining synchronization of random codes for the legitimate subscriber station to maintain reliable communications for the legitimate subscriber in the face of fraudulent activity directed against the legitimate subscriber.

In step S26, a phone number is stored in a database. The stored phone number is associated with the legitimate subscriber identity in the database. The legitimate subscriber identity is identified by monitoring phone numbers called by the legitimate subscriber identity and the illegitimate subscriber identity after a suspected misappropriation of the subscriber identity. Such monitoring information is readily available, for example, from commercially available billing systems for MSC's.

After step S26, in step S28 the legitimate subscriber's calling of the phone number stored in the database is detected after the suspected misappropriation. Simultaneously, a legitimate flag is preferably associated with the unique combination for the legitimate subscriber identity. The legitimate flag follows or tracks along as the random code is updated. The random code associated with the unique combination is dynamically updated for the legitimate subscriber to hinder or prevent fraudulent activity. The legitimate flag is preferably present for the duration of any tracking of the illegitimate subscriber identity despite any update of the random code from occurrences of call events. Because future fraud is possible, the legitimate flag is not kept unless it is periodically verified or updated by subsequent verification of one or more key called phone numbers indicating the valid user.

Figure 7:
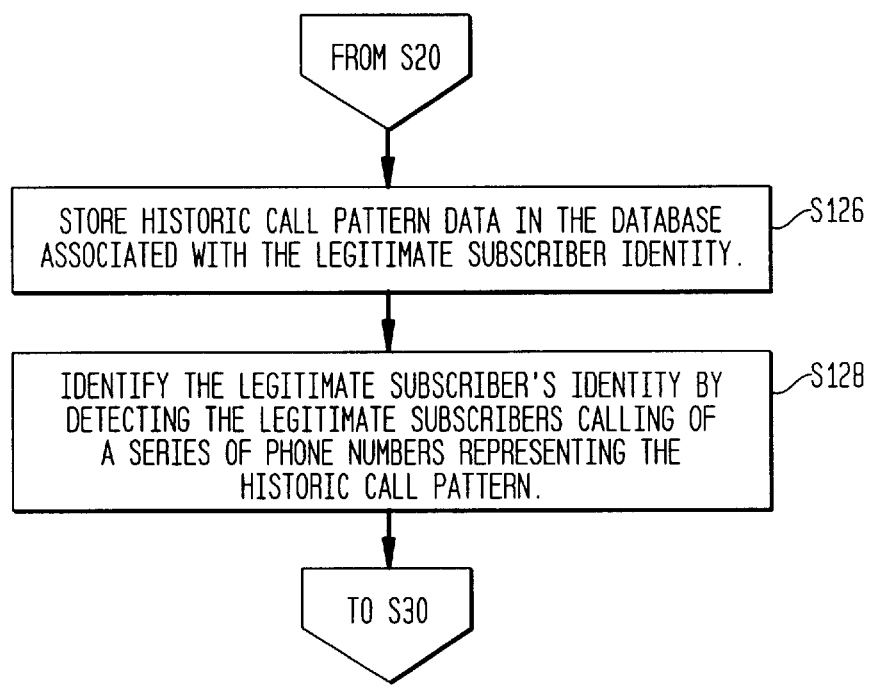
FIG. 7 is a flow chart showing a second illustrative identification procedure which may supplement FIG. 3, FIG. 4, or FIG. 5.

FIG. 7 presents an alternative identification method to FIG. 6. FIG. 7 distinguishes the legitimate subscriber station from the illegitimate subscriber station by an evaluation of historic call pattern data for the legitimate subscriber. To this end, in step S126 historic call pattern data may be stored in the database associated with the legitimate subscriber identity. The historic call pattern data may be updated at regular intervals. Thereafter, in step S128, the legitimate subscriber's identity may be identified by detecting the legitimate subscribers calling of a series of phone numbers representing the historic call pattern. The phone numbers are generally not limited to any order within the series. The series may further be defined by the typical times when the calls in the historic call pattern are made. Following step S128, the method may proceed with step S30 shown in FIG. 8.

Figure 8:
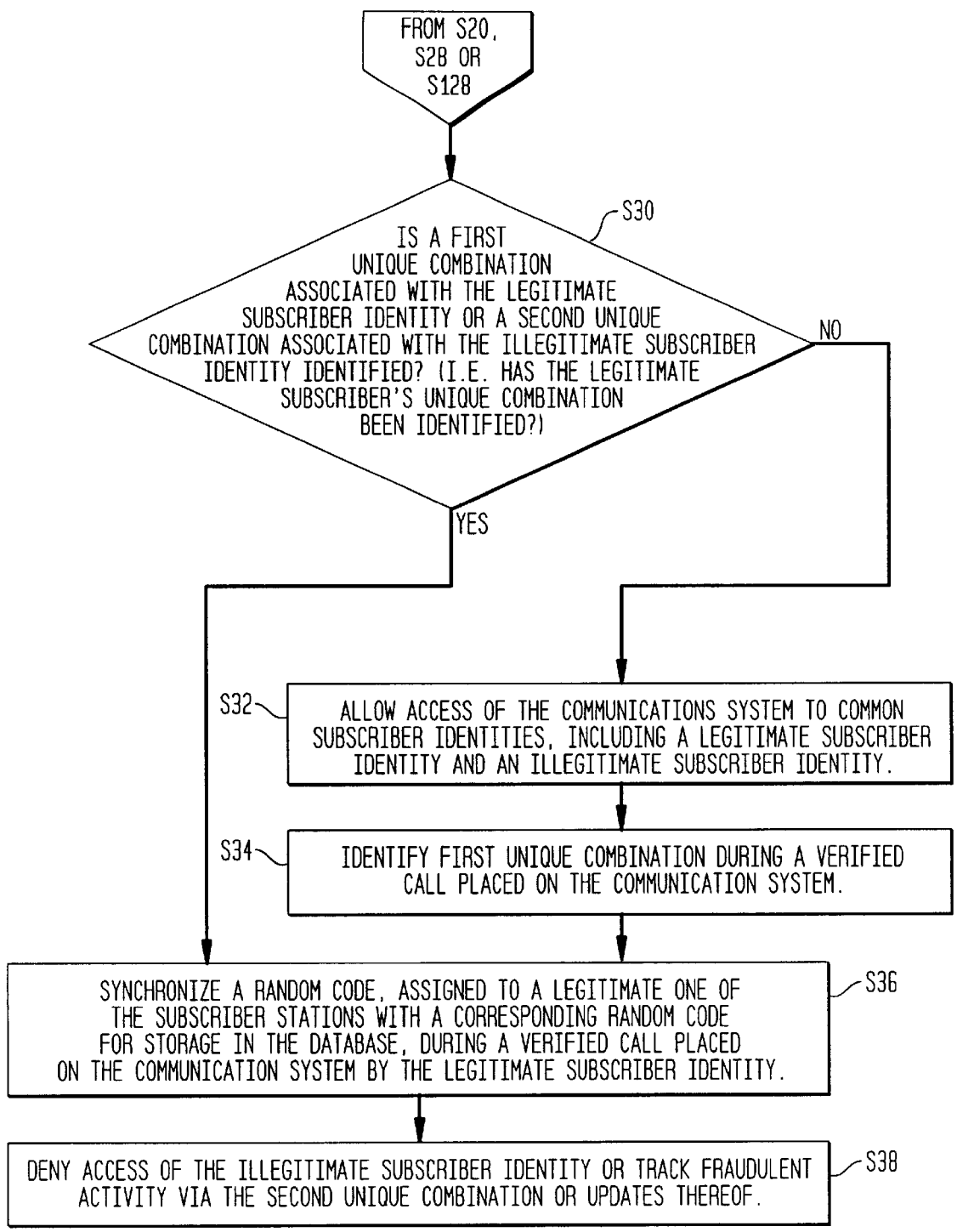
FIG. 8 is a flow chart showing an identification and synchronization procedure which may supplement FIG. 3 through FIG. 7, inclusive.

FIG. 8 shows supplemental identification and synchronization procedures which may be followed after step S20, step S28, or step S128. In particular, FIG. 8 illustrates a preferred example of synchronizing a random code, assigned to a legitimate one of the subscriber stations with a corresponding random code for storage in the database, during a verified call placed on the communication system by the legitimate subscriber identity.

Initially, in step S30, the database manager determines whether or not a legitimate subscriber's unique combination has been identified. The unique combination comprises a subscriber station identity with an associated random code, where the state of the subscriber-resident random code is known. If the legitimate subscriber's unique combination has not been identified, the method proceeds to step S32 wherein access of the communications system to common subscriber identities is allowed. The common subscriber identities include a legitimate subscriber identity and an illegitimate subscriber identity. Access may be allowed until a first unique combination associated with the legitimate subscriber identity or a second unique combination associated with the illegitimate subscriber identity is identified. The first unique combination and the second unique combination are examples of the unique combinations. Each unique combination includes a subscriber identity supplemented with a random code.

Access in step S32 is preferably not denied because the assignment of the random code is based on whether the legitimate subscriber or the illegitimate subscriber makes the next call after a misappropriation of the subscriber identity. Whoever makes the next call after the misappropriation of the subscriber identity, will be in synchronization with the random codes stored in the database, assuming that if the illegitimate subscriber makes the first call after the misappropriation that the illegitimate subscriber also misappropriated the random code. In a preferred embodiment, the random code of the invention is not encrypted for the sake of simplicity. The method of the invention exploits the preferential lack of encryption by allowing the illegitimate subscriber station to be monitored upon or after misappropriation of the random code, while simultaneously allowing the legitimate subscriber continued access to the communications system.

If the legitimate subscriber makes the first call after misappropriate of the subscriber identity, the subscriber-resident code will be in synchronization with the database-resident code stored in the database, or elsewhere in the fixed end. Meanwhile, the illegitimate subscriber's subscriber-resident code will be out of synchronization with the database-resident code.

On the other hand, if the illegitimate subscriber makes the first call after misappropriation of the subscriber identity, the illegitimate subscriber's subscriber-resident code will be in synchronization with the database-resident code stored in the database or elsewhere in the fixed end Meanwhile, the legitimate subscriber's subscriber-resident code will be out of synchronization with the database.

After step S32, in step S34 a first unique combination associated with the legitimate subscriber is identified and verified during a call placed on the communication system by the legitimate subscriber station. Step S34 preferably includes distinguishing the legitimate subscriber station from the illegitimate subscriber station based upon a test call conducted by the legitimate subscriber upon notification by an operator of the communications system.

Step S34 may be required in addition to the identification procedures shown in FIG. 6 or FIG. 7, because the legitimate subscriber using the legitimate subscriber station may depart from his/her historic call pattern or predetermined phone number call. For example, the legitimate subscriber may not call the predetermined phone number, in the database, indicative of the legitimate subscriber's identity because of human factors and events (i.e. divorce, relocation, or death). The procedure set forth in FIG. 8 accommodates for such human factors and achieves the requisite identity of the legitimate subscriber station.

After the first unique combination is identified in step S34 in accordance with one technique or prior to step S30 in accordance with another technique, the method continues at step S36. In step S36, the legitimate subscriber's random codes (subscriber-resident code and database-resident code) may be synchronized, if necessary. If the subscriber-resident random code matches the database-resident random code at a particular instant, then the subscriber-resident random code is said to be synchronized with the database-resident code. If the subscriber-resident code does not match the database-resident code at a particular instant, then the subscriber resident random code is said to be nonsynchronized with the database-resident code. If desired, the illegitimate subscriber may be deactivated by desynchronization of the illegitimate subscriber's random codes.

Restoring and insuring synchronization between the legitimate subscriber's subscriber-resident random code 14 and the database-resident code 38, prevents fraud in connection with the communication system by effectively denying unauthorized access to the communication system. While the legitimate subscriber's random code is synchronized with the fixed end, the illegitimate subscriber's access may be either denied or tracked as set forth in step S38.

Figure 9:
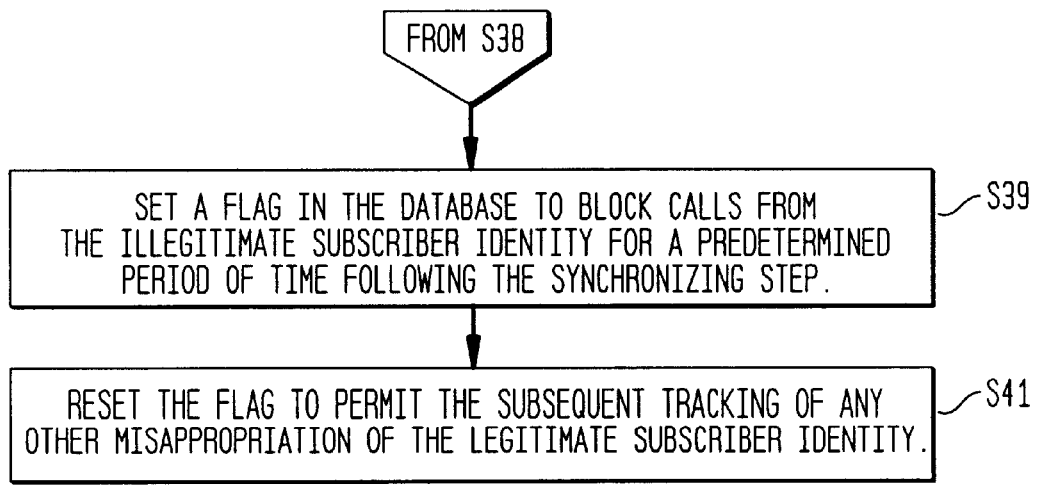
FIG. 9 is a flow chart further defining the access denial step of FIG. 8.

FIG. 9 illustrates a preferred technique in denying access to illegitimate subscriber identities as set forth in step S38. Accordingly, step S38 may include step S39 and step S41. From step S36, the method may proceed to step S39. In step S39, a flag is preferably set in the database to block calls from the second unique combination (illegitimate subscriber identity associated with a random code) for a predetermined period of time following the synchronizing step. Subsequently in step S41, the flag may be reset to permit the subsequent tracking of any other misappropriation of the legitimate subscriber identity.

Figure 10:
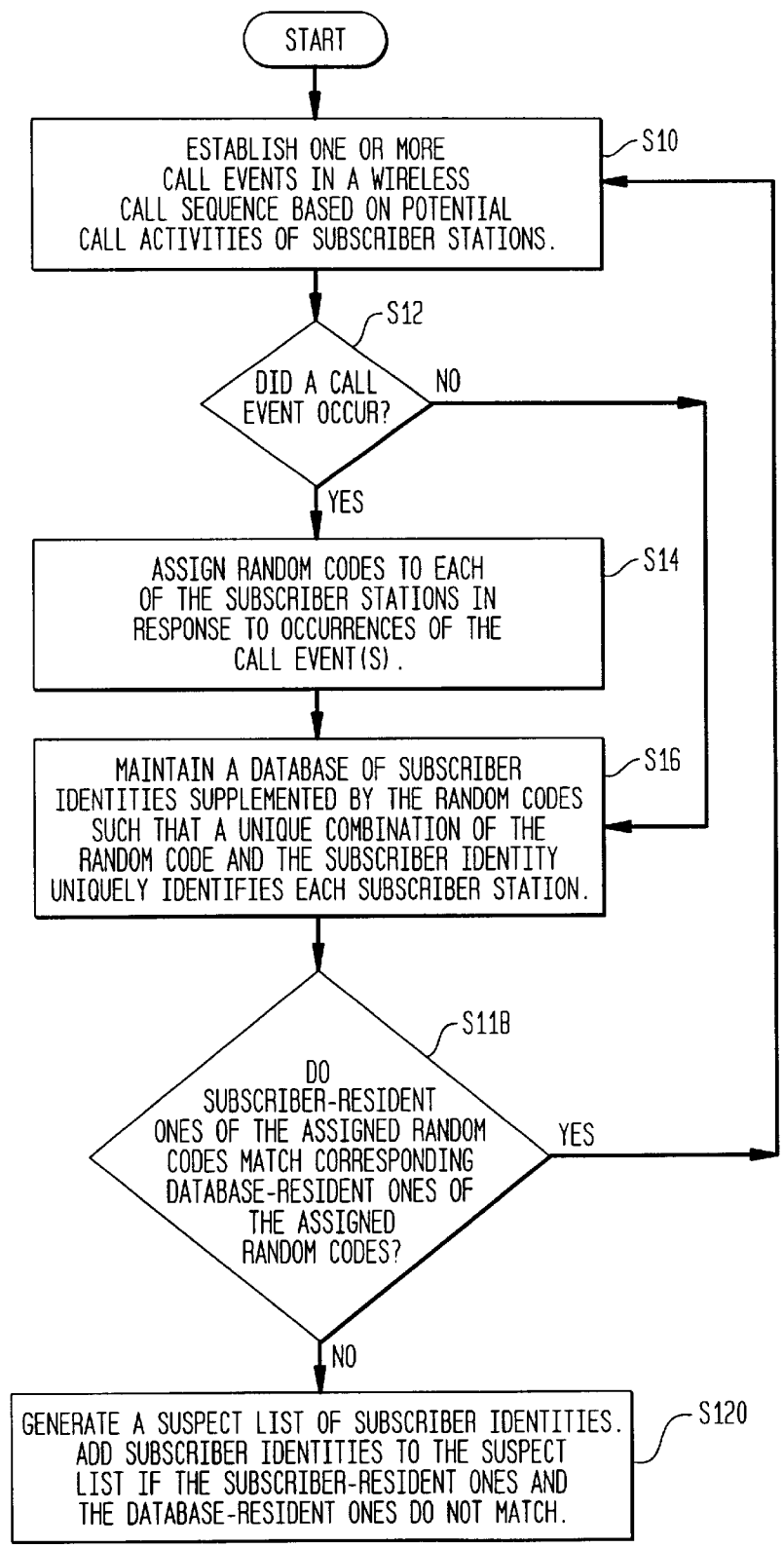
FIG. 10 is a flow chart illustrating an alternate method for detecting fraud, in accordance with the invention.

FIG. 10 shows an alternate example of a method for detecting fraud in accordance with the invention. The method of FIG. 10 is similar to the method of FIG. 1, except the method of FIG. 10 replaces step S18 and step S20 with step S118 and step S120, respectively.

Step S118 follows step S16 and is best understood with reference to the following background information. During a call sequence or a cell setup sequence the database manager 30, the base station controller 26 (BSC), the mobile switching center 28 (MSC), visitor location register (VLR) or the home location register (HLR) or another fixed end component requests the subscriber station to transmit the subscriber-resident random code 14 stored in nonvolatile memory 12 of the subscriber station 10. The database manager 30, or any other of the foregoing fixed end components, compares a database-resident random code 38 to the subscriber-resident random code 14 received in step S118.

The comparison of step S118 involves comparing the random codes previously assigned to subscriber stations to corresponding random codes stored in the database to determine whether or not the random codes stored in each subscriber station match the corresponding random code stored in the database for a single call sequence or portion thereof. The comparison of step S118 may take place on a retroactive or real-time basis.

In sum, in step S118 the communications system 11 or the database manager 30 decides if a subscriber-resident random code 14 matches the corresponding database-resident random code 38 stored in the database 34 for the subscriber station 10. If the random codes match, the method may loop back to step S10 as indicated in FIG. 10.

However, if the random codes do not match, the method proceeds to step S120 wherein the received random code (subscriber-resident random code 14) along with the subscriber station identity is added to database or a suspect list. In practice, the suspect list may be used to generate a subscriber billing number list associated with fraudulent activity, so that the subscriber billing number is not billed for unauthorized phone calls made by the illegitimate subscriber.

The above exemplary method may be further supplemented by using an identifier or nonmatch flag, associated with one or more subscriber identities. The nonmatch flags may be set for each random code that does not match as indicating the potential of fraudulent activity.

In accordance with an alternative example of the method of the present invention, the method may include denying access to one or more subscriber identities having the flag.

Figure 11:
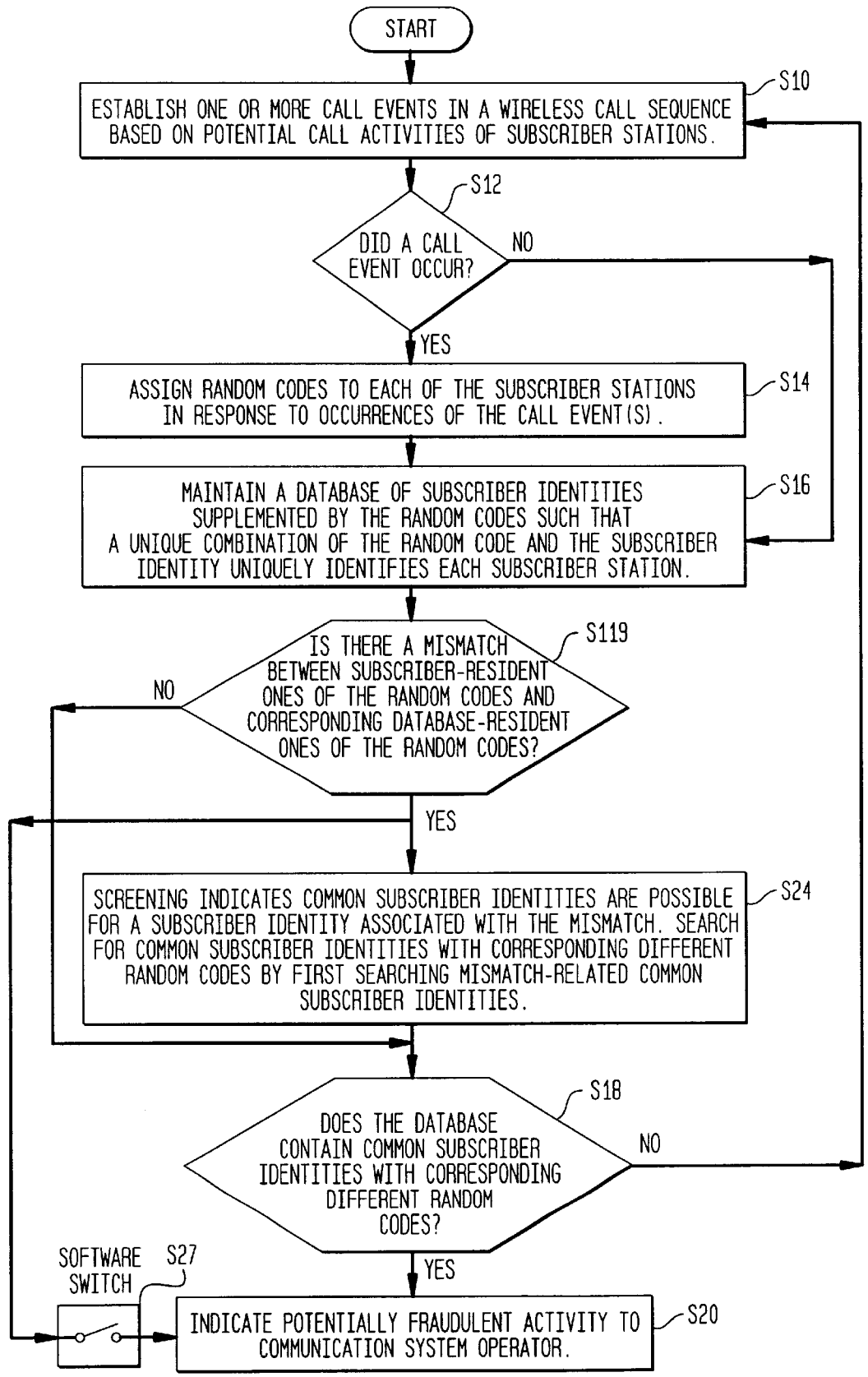
FIG. 11 is a flow chart illustrating another alternate method for detecting fraud, in accordance with the invention.

FIG. 11 shows an alternative example of the method of detecting fraud in a communications system. The steps S10, S12, S14, and S16 have been described previously in conjunction with FIG. 3.

Following step S16, the method of FIG. 11 includes a screening step S119 wherein the communications system or the database manager 30 decides if there is a mismatch between subscriber-resident ones of the random codes and corresponding database-resident ones of the codes in step S119.

If such a mismatch exists, the method continues with step S24. In step S24, the method indicates that common subscriber identities are possible for a subscriber identity associated with the mismatch. Accordingly, in step S24 subsequent searching for common subscriber identities is preferably prioritized by placing mismatch-related subscriber identities into a priority queue for later query of a database. The priority queue is subsequently accessed by first searching mismatch-related common subscriber entities for corresponding different random codes. The technique of step S24 increases searching efficiency in step S18 by narrowing the search and reducing search time for common subscriber entities. Pursuant to step S24, for example, a first subscriber identity associated with the mismatch is used as a database query or a search term for searching the database or a suspect list for second subscriber identity which is equivalent to the first subscriber identity. Together, the first subscriber identity and the second subscriber identity form a relationship of common subscriber identities.

Following step S119, if a mismatch exists, software switch S27 may be activated to permit notification of a communication system operator. Alternately, software switch S27 may be deactivated such that no indication of fraudulent activity results in step S20 in response to the "yes" input from step S119.

If a mismatch is not found step S119, the method continues with step S18. Step S18 follows either step S119 or S24. In step S18, the database manager 30 or the communications system decides whether or not the database 34 contains common subscriber identities with corresponding different random codes. If common subscriber identities with corresponding different random codes are found, step S20 indicates potentially fraudulent activity to the an operator of the communications system at an operator interface, such as an OMC connected to the MSC 28.

FIG. 12 illustrates an alternative method for preventing and detecting fraudulent activity, in accordance with the invention. The method of FIG. 12 includes establishing a first database of call events in a wireless call sequence, assigning a random code to a subscriber station in response to the occurrence of a call event, maintaining a second database of random code assignments associated with subscriber station identities, updating the random code in the subscriber station having the assigned random code at a second occurrence, and monitoring a grant of access of the subscriber station identities to the communications system based upon a simultaneous comparison of subscriber-resident random codes and database-resident random codes to detect the presence of fraudulent activity on the communications system.

In step S200, a first database of call events is established in a wireless call sequence based on potential call activity of a subscriber station. Thereafter, the method proceeds to step S202.

In step S202, it is determined whether or not a first occurrence of a call event occurred. If a first occurrence of a call event occurred, the method then proceeds to step S204.

In step S204, a random code is assigned to a subscriber station and counter n is incremented in response to a first occurrence or nth occurrence of one of said call events such that the subscriber station and the fixed end share a common code assignment for the subscriber station. If a first occurrence or nth occurrence of a call event did not occur as decided in step 202, the method continues with step S206.

In step S206, a second database is maintained. The second database includes random code assignments associated with subscriber station identities.

In step S208 it is determined whether or not a second occurrence or n+1 occurrence of a call event occurred. If a second occurrence of a call event did not occur as decided in step S208, the method continues with step S212.

In step S210, the random code is updated in the subscriber station having the assigned random code at a second occurrence or n+1 occurrence of one of said call events during the wireless call sequence; the n counter is incremented.

In step S212, a grant of access of the subscriber station identities to the communications system may be monitored. In step S212, a simultaneous comparison of subscriber-resident random codes and database-resident random codes is made after the first occurrence, the second occurrence, or both the first occurrence and the second occurrence.

In step S214, it is determined whether or not the subscriber-resident random codes have synchronized states with respect to the database-resident codes. If the subscriber-resident random codes have synchronized states with respect to the database-resident codes, then step S216 indicates the absence of fraudulent activity. On the other hand, if a subscriber-resident random code has at least one unsynchronized state with respect to a database-resident code, potentially fraudulent activity is indicated as present in step S218.

FIG. 13 provides an illustrative example of a first database of call events. The database may comprise a relational database with the database fields of FIG. 13, although in practice other database formats and database fields may be used. The illustrative database fields of FIG. 13 include call events 50, status 64, and subscriber identities 70.

The establishing step preferably includes establishing a database of the call events. A call event 50 refers to any event associated with the subscriber station's requesting access to the communication system or any event associated with the subscriber station's use of the communication systems. Call events 50 are intended to include at least the events during the call sequence from the time access is requested (i.e. a call is initiated) until the time access is relinquished (i.e. a call is terminated). Call events may include data, control, management, or overhead messages communicated unilaterally or bilaterally between the subscriber station and the base station, or over another radio frequency interface.

Illustrative examples of call events 50 which may be placed into the database include subscriber's request for access 52 to the communications system, subscriber's termination of a mobile-originated call 54, subscriber's termination of a land-line originated call 56, communication system's grant of a voice channel 60, communication system's transmitting on paging channel, subscriber's receiving on an access channel, a grant of a data channel 58, a grant of a control channel access, a call length interval exceeding a minimum interval time, dialing of a key phone number, dialing of a service provider's phone number for update of random code, dialing of a service provider's phone number plus entry of a personal identification code for update of random code, transmission of a supervisory audio tone for a predetermined duration, transmission of an inaudible tone, transmission of a character string, turning on a subscriber station, and turning off a subscriber station.

The call event database preferably contains a status field 64 which allow each call event to have an active state 66 or an inactive state 68. If the call events in the database are designated as active or inactive, only the active events trigger the assigning and updating of the random code. Referring to the illustrative example of FIG. 13, a status of ten minutes for the call interval update 62, means a call event occurs every ten minutes for the duration of a call of the corresponding subscriber identity 70. In contrast, a status of 0 minutes means the call interval update 62 is not active for the particular subscriber identity 70.

In FIG. 14, the random codes in the context of a cellular system are referred to as call tags. In the table of FIG. 14, the call tag values for a first normal call and a second normal call are shown. In the first normal call, the initial value of the subscriber call tag 75 and the database call tag 77 are simply some random value. Here, for illustrative purposes, the initial value is shown as 7. During the setup of the first call 79, the value of the subscriber call tag 75 in the cellular phone is compared to the database call tag 77 stored in the subscriber database. If the values match, the subscriber call tag 75 is updated in the cellular phone and in the service subscriber database to a new random value. Here, the new random value is shown as 13 and the call proceeds.

With regard to the second normal call 81, the value of the call tag in the phone and the subscriber database are again compared and again updated to a new random value 17. Between the first call 79 and the second call 81, the cellular phone may have been turned off so long as nonvolatile memory (i.e. 12 in FIG. 1) is used to store the value of the random code in the cellular phone. The nonvolatile memory (i.e. 12 in FIG. 1) assures synchronization is not lost from powering off the subscriber station.

In the table of FIG. 15, fraudulent cloning of a cellular phone is illustrated in the sequence of a eavesdropped call 100, a clone call 102 after the eavesdropped call 100, and a subscriber call after the clone call. During the eavesdropped call, the subscriber makes a cellular call and the setup messages are read by an unauthorized party or illegitimate subscriber. The illegitimate subscriber quickly programs another cellular phone to be clone of the subscriber's cellular phone, with respect to the cellular phone identity (i.e. MIN). In addition, the clone phone is programmed with the current value of the call tag, which is illustratively shown as 23.

If the unauthorized party does not eavesdrop on all calls made by the subscriber, which is likely, the call tags in the two phones will soon differ. The communication system will see the first call from the clone phone or the subscriber's original cellular phone as correct and the second call as inconsistent with the state of the call tag.

The table in FIG. 15 assumes that the clone phone makes the first call, called a clone call 102, after the eavesdropped call 100. The clone call 102 proceeds normally and the cloned call tag value 106 is updated from 23 to 31 in the clone phone and in the subscriber database. Note that the subscriber call tag 108 is not updated from 23 because it was not involved in the clone call.

The table in FIG. 15 assumes that the subscriber makes the next call, called the subscriber call 104, following the clone call 102. The subscriber call tag 108 in the subscriber's cellular phone and the subscriber database call tag 110 are compared and discovered to mismatch. The mismatch indicates cloning fraud. However, the communications system and the operator cannot yet be sure whether the subscriber call 104 is using the subscriber phone or the clone phone.

Accordingly, the subscriber's cellular phone is updated to have a subscriber call tag 108 of 35 and the cloned call tag 106 of the clone cellular phone is not updated. Updating is preferably carried out so the call tags of the clone phone and the subscriber phone remain different for tracking purposes.

This specification describes various illustrative examples of the method of the present invention. The scope of the claims are intended to cover various modifications and equivalent arrangements of the illustrative examples disclosed in the specification. Therefore, the following claims should be accorded the reasonably broadest interpretations to cover the modifications, equivalent structures, and features which are consistent with the spirit and the scope of the invention disclosed herein.

I claim:

1. A method for detecting fraud in wireless communications system comprising:

establishing one or more call events in a wireless call sequence based on potential call activities of subscriber stations;

assigning codes corresponding to each of the subscriber stations, in response to occurrences of said call events, such that each subscriber station has a distinguishable code from all other subscriber stations even if at least two of the subscriber stations share a common subscriber identity;

maintaining a database of subscriber identities supplemented by the codes such that a unique combination of the code and the subscriber identity uniquely identifies each subscriber station;

identifying identical or common subscriber identities with corresponding different codes in the database, any common subscriber identities with different codes being indicative of potentially fraudulent activity on the communications system.

2. The method according to claim 1 further comprising the step of generating codes for storage in the database and assignment to the subscriber stations.

3. The method according to claim 1 wherein the assigning step comprises transmitting codes to the subscriber stations during their call sequences, where the transmitted codes correspond to stored codes for storage in the database.

4. The method according to claim 1 wherein the identifying step includes:

screening for common subscriber identities by seeking mismatches between subscriber-resident ones of the codes and corresponding database-resident ones of the codes as an indication of common subscriber identities for a subscriber identity associated with the mismatch.

5. The method according to claim 1 further comprising the step of allowing access of the communications system to common subscriber identities, including a legitimate subscriber identity and an illegitimate subscriber identity, until a first unique combination associated with the legitimate subscriber identity or a second unique combination associated with the illegitimate subscriber identity is identified.

6. The method according to claim 5 further comprising the steps of:

synchronizing a code, assigned to a legitimate one of the subscriber stations with a corresponding code for storage in the database, during a verified call placed on the communication system by the legitimate subscriber identity; and setting a flag in the database to block calls from the illegitimate subscriber identity for a predetermined period of time following the synchronizing step.

7. A method for detecting fraud in wireless communications system comprising:

establishing one or more call events in a wireless call sequence based on potential call activities of subscriber stations;

assigning random codes corresponding to each of the subscriber stations, in response to occurrences of said call events, such that each subscriber station has a distinguishable code from all other subscriber stations even if at least two of the subscriber stations share a common subscriber identity;

maintaining a database of subscriber identities supplemented by the random codes such that a unique combination of the random code and the subscriber identity uniquely identifies each subscriber station;

identifying identical or common subscriber identities with corresponding different random codes in the database, any common subscriber identities with different random codes being indicative of potentially fraudulent activity on the communications system.

8. The method according to claim 7 further comprising the step of generating random codes for storage in the database and assignment to the subscriber stations.

9. The method according to claim 7 wherein the assigning step comprises transmitting random codes to the subscriber stations during their call sequences, where the transmitted random codes correspond to stored random codes for storage in the database.

10. The method according to claim 7 wherein the identifying step includes:

screening for common subscriber identities by seeking mismatches between subscriber-resident ones of the random codes and corresponding database-resident ones of the random codes as an indication of common subscriber identities for a subscriber identity associated with the mismatch.

11. The method according to claim 7 further comprising the step of allowing access of the communications system to common subscriber identities, including a legitimate subscriber identity and an illegitimate subscriber identity, until a first unique combination associated with the legitimate subscriber identity or a second unique combination associated with the illegitimate subscriber identity is identified.

12. The method according to claim 11 further comprising the steps of:

synchronizing a random code, assigned to a legitimate one of the subscriber stations with a corresponding random code for storage in the database, during a verified call placed on the communication system by the legitimate subscriber identity; and setting a flag in the database to block calls from the illegitimate subscriber identity for a predetermined period of time following the synchronizing step.

13. The method according to claim 12 further comprising the step of:

resetting said flag to permit the subsequent tracking of any other misappropriation of the legitimate subscriber identity.

14. The method according to claim 11 further comprising the step of:

storing a phone number in the database associated with the legitimate subscriber identity; and identifying the legitimate subscriber identity by detecting the legitimate subscriber's calling of the phone number stored in the database.

15. The method according to claim 11 further comprising the steps of:
  storing historic call pattern data in the database associated with the legitimate subscriber identity; and
  identifying the legitimate subscriber's identity by detecting the legitimate subscribers calling of a series of phone numbers representing the historic call pattern.

16. The method according to claim 7 wherein the identifying step comprises:
  comparing the random codes previously assigned to subscriber stations to corresponding random codes stored in the database to determine whether or not the random codes stored in each subscriber station match the corresponding random code stored in the database for a single call sequence; and
  setting a flag, associated with one or more subscriber identities, for each random code that does not match as indicating the potential of fraudulent activity.

17. The method according to claim 16 further comprising the step of:
  denying access to one or more subscriber identities having the flag.

18. The method according to claim 7 wherein the identifying step comprises:
  searching the database to find common subscriber identities with associated random codes that do not match one another;
  separating each of the common subscriber identities into one or more unauthorized subscriber identities and one authorized subscriber identities by tracking call activities of the common subscriber identities found.

19. A method for preventing fraud in wireless communications system comprising:
  establishing a first database of call events in a wireless call sequence based on potential call activity of a subscriber station;
  assigning a random code to a subscriber station in response to a first occurrence of one of said established call events such that the subscriber station and the fixed end share a common code assignment for the subscriber station;
  maintaining a second database of random code assignments associated with subscriber station identities;
  updating the random code in the subscriber station having the assigned random code at a second occurrence of one of said established call events during the wireless call sequence; and
  monitoring a grant of access of the subscriber station identities to the communications system based upon a simultaneous comparison of subscriber-resident random codes and database-resident random codes after one of said first and second occurrence, where the subscriber-resident random codes have synchronized states with respect to the database-resident codes in the absence of fraudulent activity, and where a subscriber-resident random code has at least one unsynchronized state with respect to a database-resident code in the presence of potentially fraudulent activity.

20. The method according to claim 19 wherein the establishing step comprises establishing a database of the call events selected from the group consisting of subscriber's request for access to the communications system, subscriber's termination of a mobile-originated call, subscriber's termination of a land-line originated call, communication system's grant of a voice channel, communication system's transmitting on paging channel, subscriber's receiving on an access channel, a grant of a data channel, a grant of a control channel access, a call length interval exceeding a minimum interval time, dialing of a key phone number, dialing of a service provider's phone number for update of random code, dialing of a service provider's phone number plus entry of a personal identification code for update of random code, transmission of a supervisory audio tone for a predetermined duration, transmission of an inaudible tone, transmission of a character string, turning on a subscriber station, and turning off a subscriber station.

21. The method according to claim 19 further comprising the step of designating the call events in the data base as active or inactive, and wherein only said active events trigger the assigning and updating of the random code.

22. The method according to claim 19 wherein the monitoring step comprises denial of a communications channel if the codes at the fixed end and the corresponding subscriber-resident code at the subscriber station do not match.

23. The method according to claim 19 wherein the monitoring step comprises assigning a communication channel to a subscriber station if the codes at the fixed end and the subscriber station match.

24. The method according claim 19 wherein the monitoring step comprises assignment of a communications channel regardless of whether the codes match or not.

25. The method according to claim 19 wherein the monitoring step includes monitoring subscriber access of a legitimate subscriber station and an illegitimate subscriber station.

26. The method according to claim 25 further comprising the step of distinguishing the legitimate subscriber station from the illegitimate subscriber station based upon a test call conducted by the legitimate subscriber upon notification by an operator of the communications system.

27. The method according to claim 25 further comprising the step of deactivating the legitimate subscriber station's access and the illegitimate subscriber station's access as soon as two different random codes for one subscriber station identity are noted.

28. A method for detecting fraud in wireless communications system comprising:
  establishing one or more call events in a wireless call sequence based on potential call activities of subscriber stations;
  assigning random codes to each of the subscriber stations, in response to occurrences of said call events, such that each subscriber station has a distinguishable code from all other subscriber stations even if at least two of the subscriber stations share a common subscriber identity;
  maintaining a database of subscriber identities supplemented by the random codes such that a unique combination of the random code and the subscriber identity uniquely identifies each subscriber station;
  generating a suspect list of subscriber identities by determining if subscriber-resident ones of the assigned random codes match corresponding database-resident ones of the assigned random codes, and adding subscriber identities to the suspect list if the subscriber-resident ones and the database-resident ones do not match.

\* \* \* \* \*